United States Patent [19]

Smythies

[11] 3,873,722
[45] Mar. 25, 1975

[54] METHOD FOR TREATING SCHIZOPHRENIA
[75] Inventor: John Raymond Smythies, Birmingham, Ala.
[73] Assignee: Nelson Research & Development Company, Irvine, Calif.
[22] Filed: May 31, 1974
[21] Appl. No.: 475,047

[52] U.S. Cl. ................................................ 424/319
[51] Int. Cl. ............................................ A61k 27/00
[58] Field of Search .................................... 424/319

[56] References Cited
OTHER PUBLICATIONS
Chem. Abst., 75 – 144015e (1971).

*Primary Examiner*—Stanley J. Friedman
*Attorney, Agent, or Firm*—Martin A. Voet

[57] ABSTRACT
A method for temporarily alleviating symptoms of schizophrenia comprising administering to a schizophrenic an effective amount of 1-serine.

2 Claims, No Drawings

METHOD FOR TREATING SCHIZOPHRENIA

BACKGROUND OF THE INVENTION

1. Field of the Invention

The invention relates to a therapeutic method. More particularly, the invention relates to a method for temporarily alleviating symptoms of schizophrenia.

2. Background of the Prior Art

Schizophrenia is a psychosis characterized by emotional, intellectual and behavioral disturbances, such as withdrawal from reality, delusions and progressive deterioration.

It is known that approximately 40 percent of schizophrenics react adversely to the effects of l-methionine. That is, when chronic schizophrenics orally ingest l-methionine, approximately 40% of them develop an acute florid psychosis. Based on the foregoing observation, it is apparent that l-methionine, or a metabolic product thereof, acts in some manner in some schizophrenics to worsen symptoms.

SUMMARY OF THE INVENTION

The present invention relates to a method for temporarily alleviating symptoms of schizophrenia comprising administering to a schizonphrenic an effective amount of l-serine.

DETAILED DESCRIPTION OF THE INVENTION

L-Serine is a naturally occuring amino acid and is commercially available. An effective amount of l-serine varies with the type of patient, but generally ranges between about 1 and about 25 grams per day and preferably about 10 to about 20 grams per day orally for a period of about 1 to 10 weeks. Additional treatment may also be necessary. Generally, the l-serine (a non-toxic material) is mixed with the patient's food or swallowed by the patient in capsules.

EXAMPLE I

Rats given 250 mg/Kg l-methionine evidenced behavioral disruptions similar to that induced by LSD and other hallucinogenic drugs. Simultaneous administration of l-serine (250 mg/Kg) prevented behavioral disruption.

I claim:

1. A method for temporarily alleviating symptoms of schizophrenia comprising orally administering to a schizophrenic an effective amount of l-serine.

2. The method of claim 1 wherein an effective amount is about 1 to about 25 grams of l-serine per day.

* * * * *